Dec. 17, 1940.    T. E. BROOKS    2,225,205
MAGNETIC PLUG
Original Filed June 1, 1937
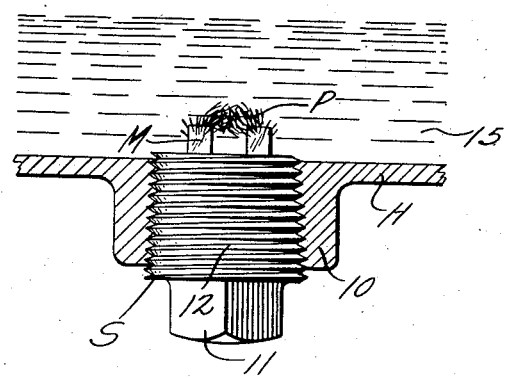
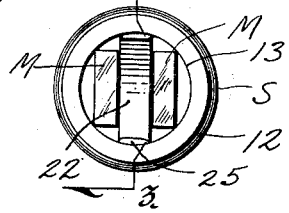
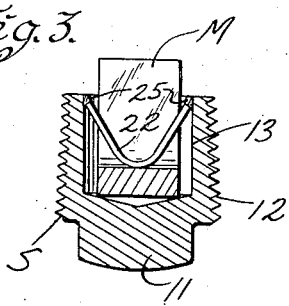
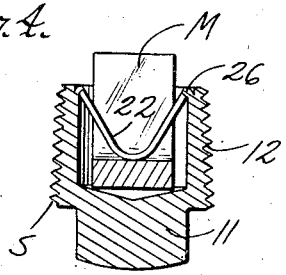
Inventor
Thomas E. Brooks
by Bair & Freeman
Attorneys Patented Dec. 17, 1940

2,225,205

UNITED STATES PATENT OFFICE 2,225,205

MAGNETIC PLUG

Thomas E. Brooks, Clarinda, Iowa, assignor to Lisle Corporation, Clarinda, Iowa, a corporation of Iowa Original application June 1, 1937, Serial No. 145,825. Divided and this application June 27, 1938, Serial No. 216,082

3 Claims. (Cl. 209—215)

One of the most important objects of my present invention is to provide simple and inexpensive means for rigidly securing a magnetic core within the recess of a plug-like shell and against accidental dislodgement therefrom to thereby provide a magnetic plug adapted for insertion in a lubricant or other opening of a gear housing or the like.

My present application is a division of my co-pending application Serial No. 145,825, filed June 1, 1937.

A further objetc is to provide various arrangements of fastening means which extend through the magnetic core and serve to effectively secure the magnetic core in the shell against accidental displacement therefrom.

Still a further object is to secure a magnetic core in a shell or body so that it will operate efficiently to attract steel or other stray particles within the housing, such housing being ordinarily filled with oil or grease to lubricate the gearing or other mechanism therein.

A further object is to provide fastening means for a magnet relative to a plug or body which does not necessitate drilling a hole or forming other openings in the magnetic cores, which are of extremely hard material and difficult to machine without affecting their magnetic properties.

With these and other objects in view, my invention consists in the construction, arrangement and combination of the various parts of my magnetic plug, whereby the objects contemplated are attained, as hereinafter more fully set forth, pointed out in my claims, and illustrated in the accompanying drawing, in which:

Figure 1 is a sectional view through the lubricant opening boss of a transmission or other type of gear housing, showing one of my plugs installed relative thereto.

Figure 2 is a plan view of the plug shown in Figure 1.

Figure 3 is a sectional view thereof on the line 3—3 of Figure 2 and showing a spring clip which has its ends welded in position for retaining the magnet in the shell; and Figure 4 is a sectional view similar to Figure 3 showing a modification in which the spring clip is held in position by the edge of the recess in the plug being swedged over the upper ends of the clip.

On the accompanying drawing I have used the reference character H to indicate a housing such as one for transmission or differential gears or the like. The housing H is provided with a boss 10 which may be utilized for receiving a drain plug or a plug which can be removed for introducing lubricant into the housing H depending of course on the installation. Also, various housings for different types of machinery may be provided with the boss 10 specifically to receive magnetic plugs of the type disclosed for the purpose of attracting small magnetic particles in the housing and prevent them from entering and damaging gear teeth or other mechanism.

My plug comprises a shell S, a magnet M and means for retaining the magnet in the shell. The shell S has an integral nut portion 11 for removing and positioning the shell relative to the boss 10. The shell has a threaded portion 12 for engagement with the threads of the boss 10. Within the shell S I provide a recess 13 which is of such size relative to the magnet M that the magnet may fit snugly therein as best illustrated in Figure 2. The shell S may be made of metal of any kind. For instance, brass is suitable although cast iron or the like can be used.

It is desirable when the metal is ferrous however to provide a spacing or insulating means to get maximum efficiency from the magnet M as too much short-circuiting of the magnetism thereof will lessen the efficiency to some extent. Such a means is shown in my co-pending application Serial No. 216,083 filed June 27, 1938. However, for all practical purposes such insulation is not necessary.

Preferably the poles of the magnet M extend slightly beyond the upper end of the shell S so that the strongest magnetic field is thus in position to readily attract particles P from the oil 15 in the housing H as shown in Figure 1.

I have shown a plurality of different methods by which the magnet M may be retained in the shell S. In Figures 1, 2 and 3 the retainer consists of a spring clip 22 welded as indicated at 25 to the shell S and thus retained in position. The welding 25 is located adjacent the upper edge of the recess 13 where the welding operation can be readily performed and the welding connects the upper end of the clip 22 to the shell S. The clip 22 is V-shaped and its apex engages with the cross member of the magnet M for holding the cross member down against the bottom of the recess 13.

In Figure 4 the edge of the shell S adjacent the recess 13 has been swedged at two points indicated at 26 to retain the spring clip 22 and thereby the magnet M in position. This arangement calls for a very simple swedging operation which can be readily performed after the magnet and the clip have been inserted in the recess 13.

From the foregoing description it is obvious that my retainer clip effectively and inexpensively secures a magnetic core within a shell or body to provide a magnetic plug unit for gear housings or the like.

Some changes may be made in the arrangement and construction of the various parts of my magnetic plug without departing from the real spirit and purpose of my invention, and it is my intention to cover by my claims, any modified forms of structure or use of mechanical equivalents, which may be reasonably included within their scope.

I claim as my invention:

1. A magnetic plug for power transmission housings and the like having a lubricant opening comprising a magnet of horseshoe type, a body for supporting said magnet, said body being formed to fit in and close said lubricant opening and having in its inner end a recess to receive said magnet with the cross piece thereof seated in said recess, means interlocking with said magnet for retaining it in said body, said means comprising a spring clip extending through said magnet between the poles thereof, the center of said clip engaging the crosspiece of said magnet and projections from said body engaging the ends of said spring clip to retain it and thereby said magnet in position relative to said body.

2. A magnetic plug for power transmission housings and the like having a lubricant opening comprising a horseshoe magnet, a body for supporting said magnet, said body being formed to fit in and close said lubricant opening and having in its inner end a recess to receive the cross piece of said magnet, means interlocking with said magnet for retaining it in said body, said means comprising a retainer for said magnet, means extending from the shell and overhanging the retainer to affix it in position, said retainer being interposed in thrust relation between said overhanging means and said cross piece of said magnet.

3. A magnetic plug for power transmission housings and the like having a lubricant opening comprising a magnet of horseshoe type, a body for supporting said magnet, said body being formed to fit in and close said lubricant opening and having in its inner end a recess to receive said magnet with the cross piece thereof seated in said recess, means interlocking with said magnet for retaining it in said body, said means comprising a U-shaped spring clip extending through said magnet between the poles thereof, the center of said clip engaging the crosspiece of said magnet, and means rigid with relation to said body and engaging the terminal ends of said spring clip to retain said magnet in position relative to said body by thrust of the arms of the U-shaped spring clip between said crosspiece and said last means.

THOMAS E. BROOKS.